United States Patent [19]

Stoller

[11] Patent Number: 5,266,942
[45] Date of Patent: Nov. 30, 1993

[54] SECURITY SYSTEM WITH MEMORY IN TRANSMITTER AND RECEIVER

[76] Inventor: Gerald S. Stoller, 2 Bedford Ct., Spring Valley, N.Y. 10977

[21] Appl. No.: 748,754

[22] Filed: Aug. 21, 1991

[51] Int. Cl.$^5$ ................................................ G06F 7/04
[52] U.S. Cl. ............................ 340/825.34; 340/825.32
[58] Field of Search ............ 340/825.3, 825.31, 825.32, 340/825.34; 380/6, 9, 21, 23, 28, 49

[56] References Cited

U.S. PATENT DOCUMENTS

| | | |
|---|---|---|
| 4,074,066 | 2/1978 | Ehrsam et al. |
| 4,464,651 | 8/1984 | Duhame. |
| 4,535,333 | 8/1985 | Twardowski. |
| 4,596,898 | 6/1986 | Pemmaraju. |
| 4,607,137 | 8/1986 | Jansen et al. |
| 4,677,657 | 6/1987 | Nagata et al. |
| 4,750,118 | 6/1988 | Heitschel et al. |
| 4,808,995 | 2/1989 | Clark et al. |
| 4,853,962 | 8/1989 | Brockman. |
| 4,870,683 | 9/1989 | Atalla. |

Primary Examiner—Donald J. Yusko
Assistant Examiner—J. Giust
Attorney, Agent, or Firm—Amster, Rothstein & Ebenstein

[57] ABSTRACT

A security system to defeat eavesdropping in a broadcast environment has at least one transmitter and at least one receiver. The transmitter includes a transmitter memory for storing a plurality of signals in a given sequence and a marker for identifying in the transmitter memory particular ones of the signals as invalid, as well as a broadcast-transmitter for transmitting in sequence at least a portion of those signals of the transmitter memory not identified as invalid. The receiver includes a receiver memory for storing a plurality of signals in a given sequence, and a marker for identifying in the receiver memory particular ones of the signals as invalid, as well as a broadcast-receiver for receiving signals transmitted by the transmitter. A receiver circuit in the receiver compares the signal received by the receiver with those signals of the receiver memory not identified as invalid, and, upon a successful comparison, both identifies the signal in the receiver memory as invalid thereafter and generates a successful comparison indicator.

24 Claims, 11 Drawing Sheets

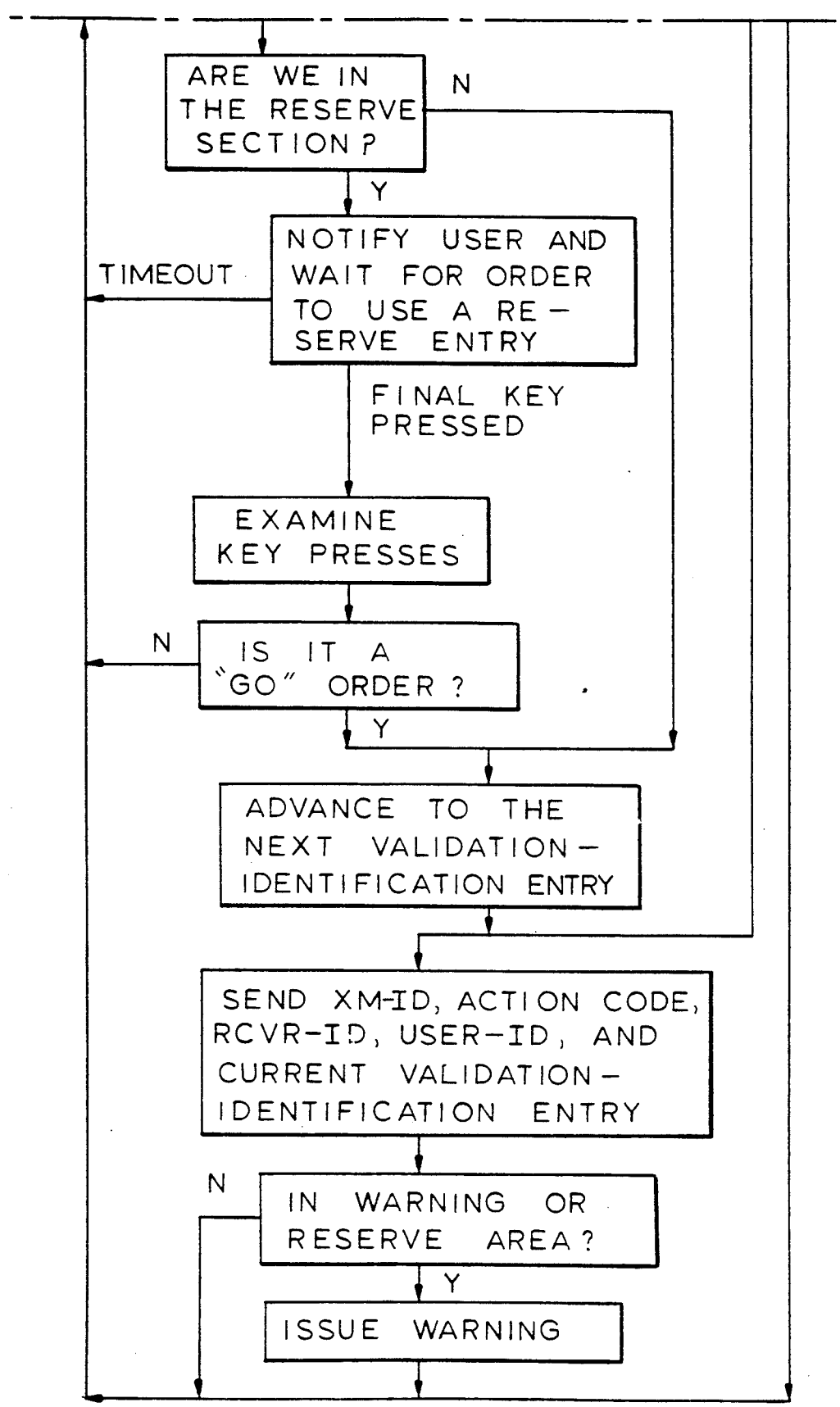

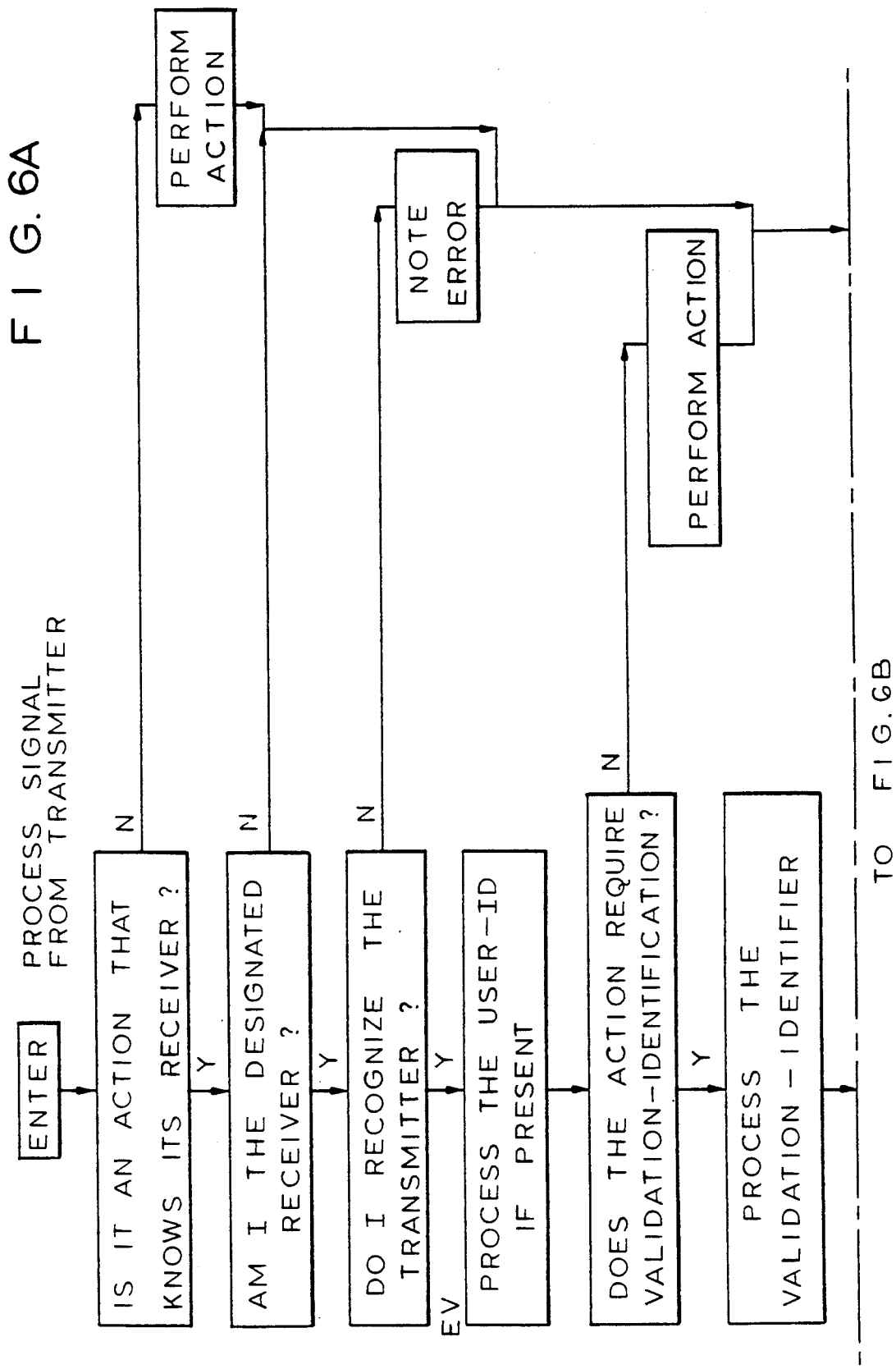

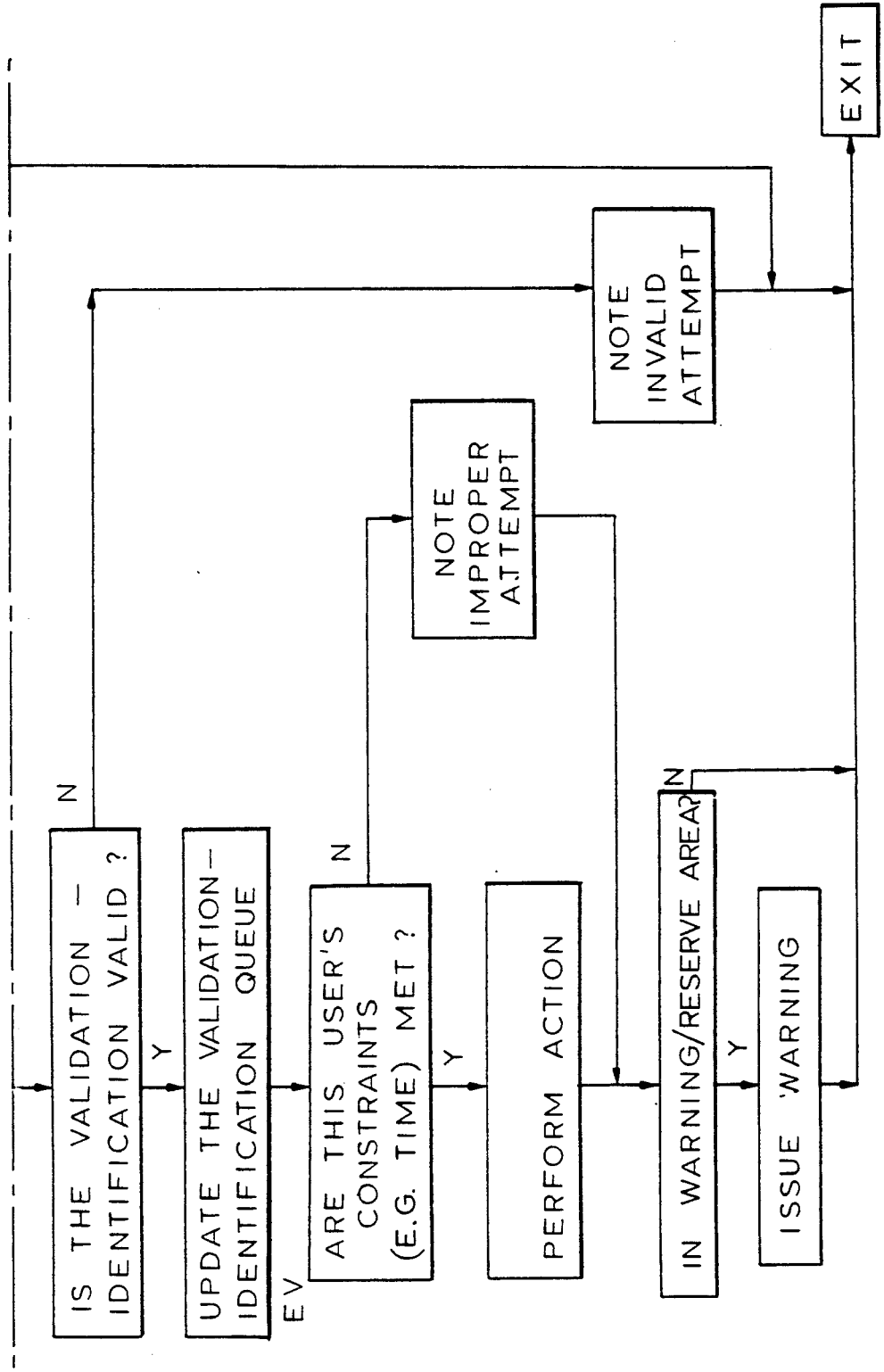

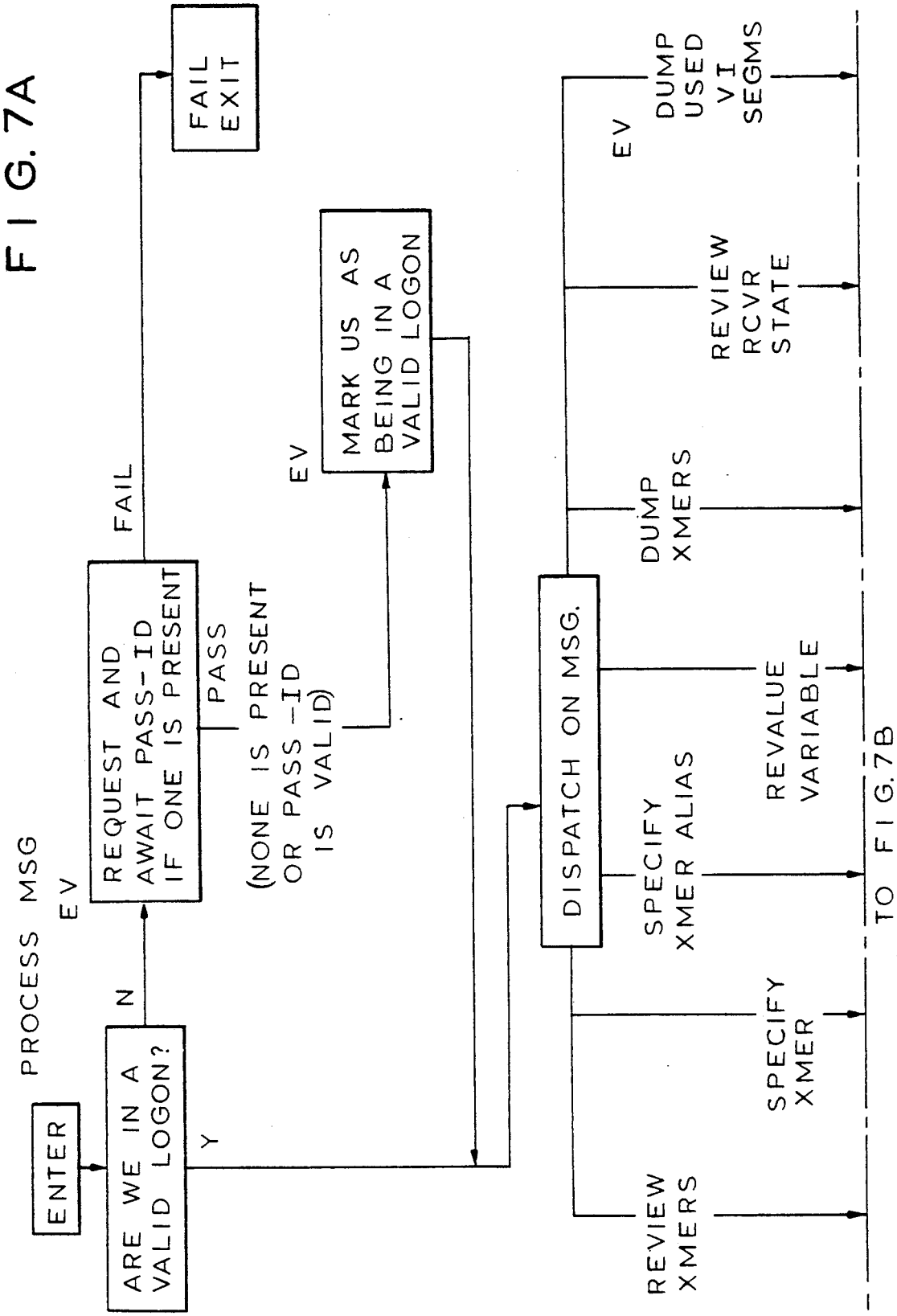

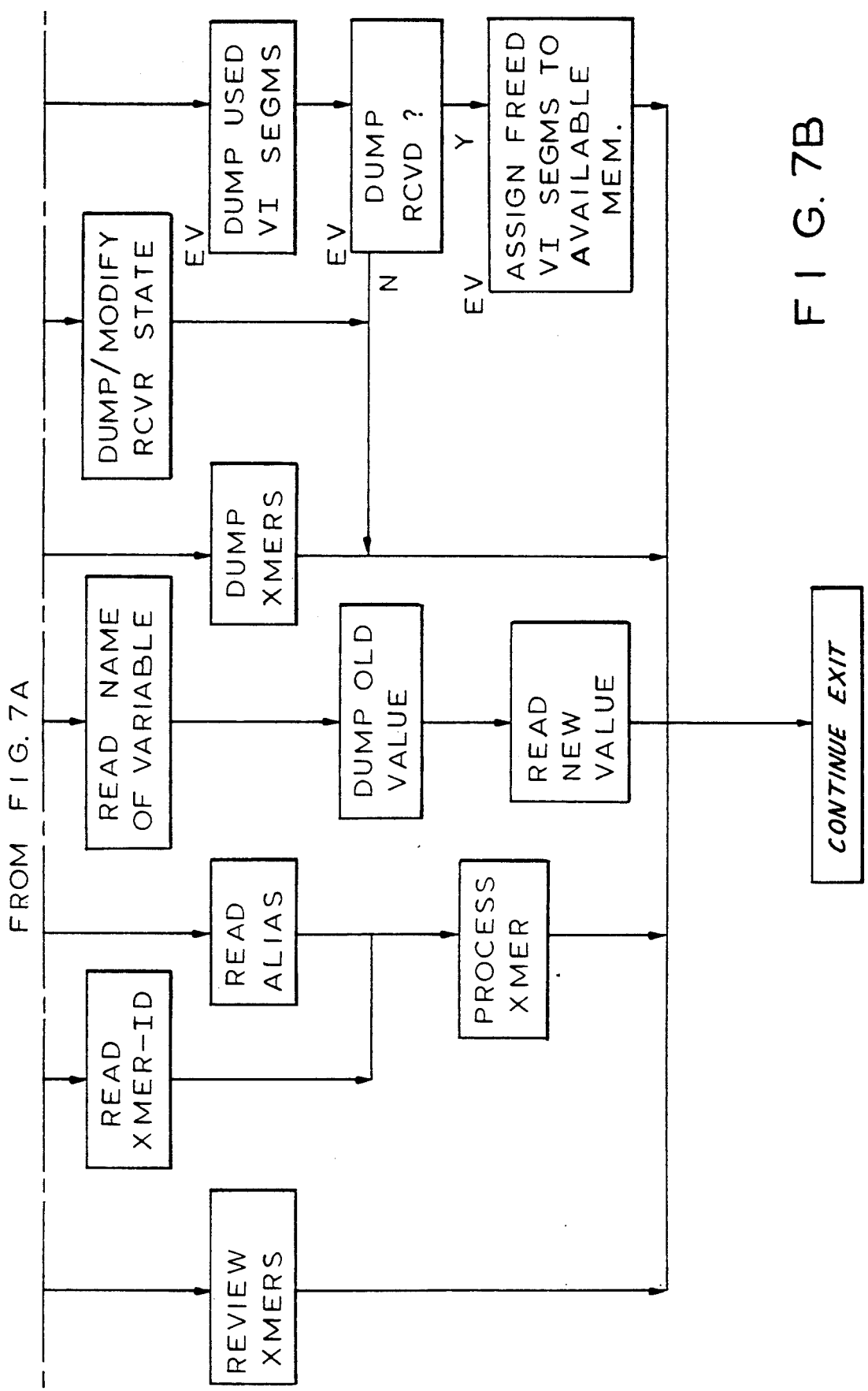

FIG. 8A

```
RECEIVER  KEY DEPRESSED
            ┌─────────┐
            │  ENTER  │
  EV        └────┬────┘
                 ↓
     ┌──────────────────────┐
     │  REQUEST AND AWAIT   │  FAIL
     │     PASS-ID IF       ├──────────┐
     │   ONE IS PRESENT     │          │
     └──────────┬───────────┘          │
               PASS                    │
     (NONE IS PRESENT                  │
      OR PASS-ID                       │
       IS VALID)                       │
                ↓                      │
     ┌──────────────────────┐ TIME-OUT │
┌───→│  WAIT FOR KEY DE-    ├──────────┤
│    │  PRESSION OR TIME-OUT│          ↓
│    └──────────┬───────────┘       ┌──────┐
│          KEY DEPRESSION           │ EXIT │
│               ↓                   └──────┘
│    ┌──────────────────────┐
│    │   DISPATCH ON KEY    │
│    │   FOUND DEPRESSED    │
│    └──┬───────┬────────┬──┘
│   REVIEW   SPECIFY   SPECIFY XMER
│   XMER     XMER      ALIAS
│    ↓         ↓          ↓
│ ┌──────┐ ┌────────┐ ┌────────┐
│ │REVIEW│ │ ENTER  │ │ ENTER  │
│ │XMERS │ │XMER ID │ │ ALIAS  │
│ └───┬──┘ └────┬───┘ └───┬────┘
│     │        ↓          │
│     │   ┌─────────────┐ │
│     │   │DISPLAY XMER │←┘
│     │   │   ENTRY     │
│     │   └──────┬──────┘
│     │          ↓
│     │   ┌─────────────┐
│     │   │  PROCESS    │
│     │   │ XMER ENTRY  │
│     │   └──────┬──────┘
└─────┴──────────┘
```

TO FIG. 8B

SECURITY SYSTEM WITH MEMORY IN TRANSMITTER AND RECEIVER

BACKGROUND OF THE INVENTION

The present invention relates to a security system for a broadcast environment, and more particularly to such a system which defeats eavesdropping.

This invention relates to an electronic security system that addresses the security issue in the broadcast environment: transmitter (including transceiver acting as transmitter) to receiver (including transceiver acting as receiver). A broadcast signal, once sent by a transmitter or transceiver, is recognized by a receiver or transceiver, which appropriately responds to it. Since the environment is a broadcast environment, eavesdropping is phenomenally easy and relatively undetectable. The broadcast signal eavesdropped upon can be recorded and then replayed at a later time by the eavesdropper at his volition. Hence, that which is radio-transmitted or broadcast is no longer private information. The only solution is for the broadcast signal to have a private part, which is discarded after use, since the private part maintains its privacy until it is used.

In the general view, the receiver (whether it be exclusively a signal receiver or one transceiver of a communicating pair) grants access to a site, information, or functional capability, upon receipt of a valid signal, so we shall call it the "access grantor" (i.e., the lock). The transmitter (whether it be exclusively a signal transmitter or the other transceiver of the communicating pair) transmits a signal (a packet of data) to the receiver ("access grantor") requesting access to a site. information, or functional capability, so we shall call it the "access requestor" (i.e., the key).

Among the many possible applications for an electronic key are radio-transmitter electronic garage door opener, remote car locker/unlocker or starter, replacements for standard keys and locks, cordless phones (to protect access to a phone line from an unauthorized cordless phone), wildlife researchers' radio-transmitter collars, and so on.

The current crop of radio-transmitter electronic garage door openers and the like easily succumb to even a semi-intelligent attack. There are so few possible "code" signals available (typically about 512 for a given frequency) that a computerized brute force try at all of them can be done in a very short time using a computer. Even increasing the number of possible "code" signals available will not help, since it is relatively easy for an eavesdropper to record the signal when the proper user transmits it to perform the designated function (e.g., to open or close the garage door); it can then be played back at any later time at the eavesdropper's volition.

Accordingly, it is an object of the present invention to provide a security system which cannot be defeated by eavesdropping.

SUMMARY OF THE INVENTION

It has now been found that the above and related objects of the present invention are obtained in a security system comprising a transmitter (including one transceiver of a communicating pair) and a receiver (including the other transceiver of the communicating pair). The transmitter includes transmitter memory means for storing a plurality of signals in a given sequence, means for identifying in the transmitter memory means particular ones of the signals as invalid, and means for transmitting in sequence at least a portion of those signals of the transmitter memory means not identified as invalid. The receiver includes means for receiving a signal transmitted by a transmitter, receiver memory means for storing a plurality of signals in a given sequence, and means for identifying in the receiver memory means particular ones of the signals as invalid. The receiver also includes means for comparing the signal received by the receiver with those signals of the receiver memory means not identified as invalid, and, upon a successful comparison, both identifying the signal in the receiver memory means as invalid thereafter and generating a successful comparison indicator.

In a preferred embodiment, the signals are numbers, typically random numbers generated by an external device separable from the transmitter, the external device including means for generating a plurality of random numbers in a given sequence and forwarding at least a portion of the plurality of random numbers in a given sequence to the transmitter. The means for identifying in the transmitter memory means particular ones of the signals as invalid and the means in the receiver for identifying in the receiver memory means particular ones of the signals as invalid preferably erases those particular ones of the signals. The transmitter includes manual means for causing the transmitting means to transmit the next successive signal in sequence of the transmitter memory means not identified as invalid; means, upon an unsuccessful comparison, for generating an unsuccessful comparison indicator; and means, active only upon generation in sequence of a predetermined number of unsuccessful comparison indicators, for indicating that the system is under attack.

The security system may include a plurality of the transmitters. Each of the transmitters includes means for storing a unique transmitter identifier associated with a given transmitter, and means for transmitting the transmitter identifier prior to transmitting in sequence those signals of the transmitter memory means not identified as invalid. The receiver includes means for receiving the transmitter identifier transmitted by a transmitter and a plurality of receiver memory means, each of the receiver memory means being keyed to a unique transmitter identifier associated with that given transmitter, and the comparison means comparing the signal received with only those signals of the receiver memory means not identified as invalid in the receiver memory means associated with the transmitter identifier received.

The security system may include a plurality of the receivers. The transmitter includes a plurality of the transmitter memory means, each of the transmitter memory means being keyed to a unique receiver identifier associated with a given receiver, manual means for selecting a particular receiver identifier, and means for transmitting in sequence only those signals not identified as invalid in the transmitter memory means associated with the selected particular receiver identifier.

In an enhanced version of the system, the transmitter additionally includes transmitter user identification memory means for storing at least one user identification, means for receiving a user identification from the user, and means for comparing the received user identification with the user identifications stored in the transmitter user identification memory means, the transmitting means being operable only after a successful comparison. The transmitter user identification memory means stores a plurality of user identifications in a given sequence, and the comparing means compares the received user identification with each of the user identifications stored in the transmitter user identification memory means in sequence until a successful comparison. The transmitter additionally includes password memory means for storing one password per user, means for receiving a password from the user, and means for comparing the received password with the passwords stored in the transmitter password memory means, the transmitting means being operable only after a successful comparison. There are also means for counting per user the number of passwords received since the last successful comparison, and means for operatively erasing the password in the transmitter password memory means and the associated signals in the transmitter memory means if more than a predetermined number of passwords are received since the last successful comparison for the user (thus indicating that the system is under attack) The transmitter password memory means stores one password as associated with each user identification, and the means for comparing the received password with the password identification stored in the transmitter password memory means compares the received password only with the password stored in the transmitter password memory means as associated with a given user identification.

The transmitter will additionally include reserve actuation means requiring additional manual actuation by a user, transmitter reserve memory means for storing a reserve plurality of signals in a given sequence, reserve means for identifying in the transmitter reserve memory means particular ones of the signals as invalid, and reserve transmitting means for transmitting in sequence at least a portion of those signals of the transmitter reserve memory means not identified as invalid, the reserve transmitting means being operable upon actuation of the reserve actuation means. The reserve actuation means is actuatable only when each of the signals in the transmitter memory means is identified as invalid.

BRIEF DESCRIPTION OF THE DRAWING

The above brief description, as well as further objects and features of the present invention, will be more fully understood by reference to the following detailed description of the presently preferred, albeit illustrative, embodiments of the present invention when taken in conjunction with the accompanying drawing wherein:

FIGS. 4A and 4B constitute a flow chart of the operation of the transmitter;

FIG. 4C is a flow chart of the User-ID/Pass-ID Check sub-routine;

FIGS. 6A and 6B constitute a flow chart of the operation of the receiver upon receipt of a signal from the transmitter;

FIGS. 7A and 7B constitute a flow chart of the operation of the receiver upon receipt or a message (from a computer or the like); and FIGS. 8A and 8B constitute a flow chart of the operation of the receiver upon depression of a key thereof.

DETAILED DESCRIPTION OF THE PREFERRED EMBODIMENTS

Figure 1:
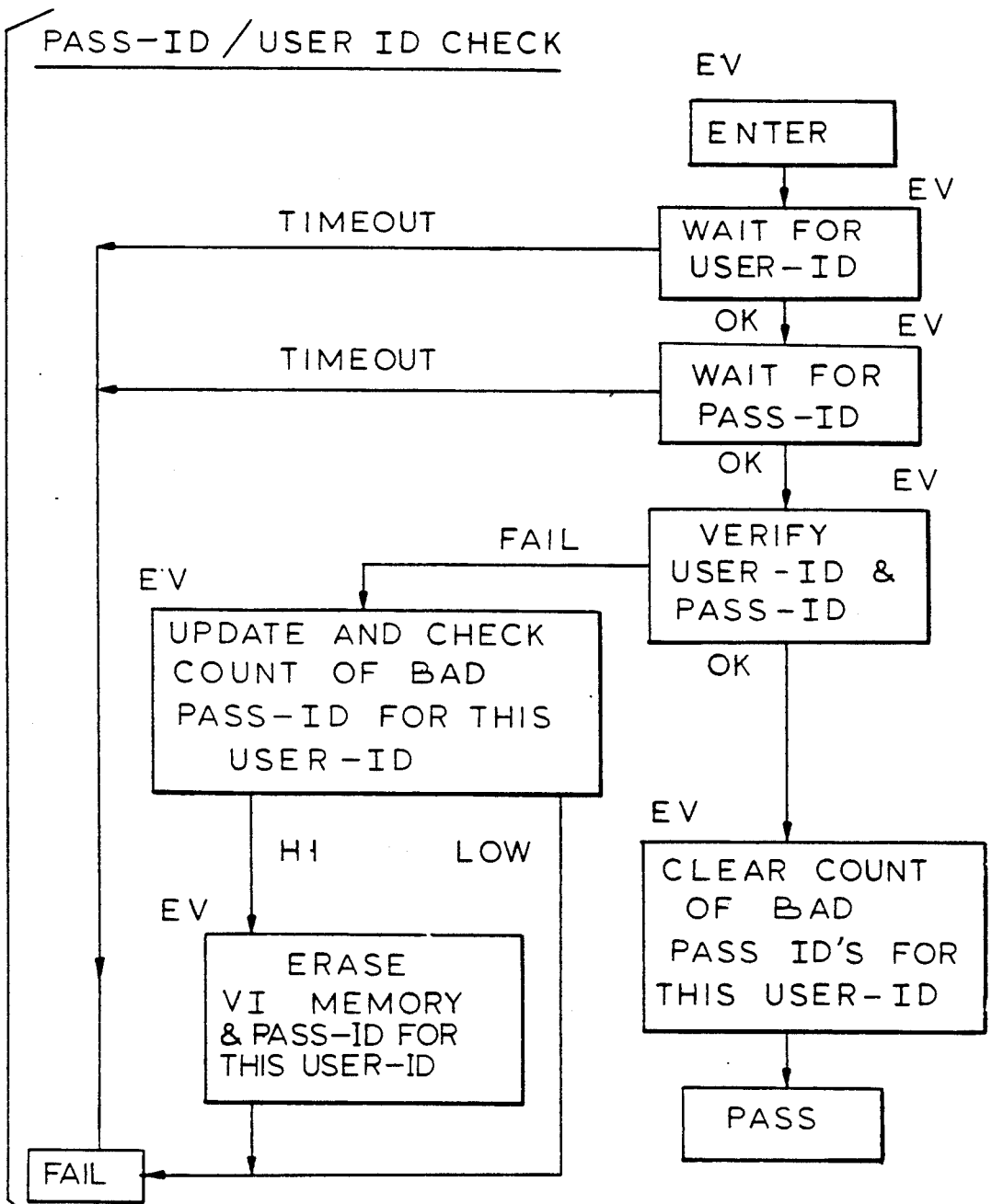
FIG. 1 is an overall schematic of a security system according to the present invention.

A security system according to the present invention includes a pool of devices, some of which are called "access grantors" or receivers and others of which are called "access requestors" or transmitters. An access requestor sends a signal to the access grantors in its vicinity, or, via some transmission medium (e.g., a phone line), to an access grantor at some distance. An access grantor will grant an access requestor (which is "accredited" to it) access to its functionality provided that the access requestor identifies itself sufficiently to be given the functionality that it requested and, where required, provides acceptable identification.

The present invention recognizes that in a transmitter-to-receiver broadcast environment, once a signal is broadcast, it can no longer be guaranteed to be private since anyone may be eavesdropping. Hence, according to the present invention, once the receiver receives a broadcast signal that has a validator part that should be private, it invalidates that validator part so that it will no longer accept it as a validator. The transmitter, knowing of this modus operandi of the receiver, marks that validator part of a signal as used once it has broadcast it and will no longer use it. Thus this validator or private part of the broadcast signals constitutes a "one-time pad." We shall call this validator or private part of the broadcast signals the "validation-identification" ("VI") sequence of bytes. It is composed of randomly selected byte values and is a sub-sequence or subset of the full identification sequence or set of bytes. On the other hand, the receiver, knowing of this modus operandi of the transmitter, once it receives a valid VI, will then invalidate not only that entry in its queue of VI's, but also all prior entries in that queue (since the transmitter should not be using them, as it goes through its identical queue in order).

It is still possible that two access grantors that are in close radio-proximity may have the same VI in their respective one-time pads, and so both would respond to the broadcast. To avoid this undesirable result, part of the full identification sequence of bytes will uniquely identify the access requestor by a transmitter-ID. This is still not enough, since an access requestor may be "accredited" to more than one access grantor, and it is possible that two of the access grantors may be in close enough radio-proximity to receive a single broadcast, and may have the same VI in their respective one-time pads, and so both would respond to this broadcast. Hence, part of the full identification sequence of bytes will uniquely identify the desired access grantor by a receiver-ID. Uniquely identifying the access grantor (but not the access requestor) in the signal will not suffice since several access requestors may be "accredited" to this access grantor, and the access grantor should not respond to one access requestor based on a VI in a list associated with another access requestor. Consequently, both participants—the access grantor and the access receiver—must be identified.

While this discussion may appear to give the impression that security is lax in this broadcast key environment, such is not the case. However, if there are several million of these broadcast keys in use, the probability that an undesired access will be granted can increase enormously, and this probability will increase still more with usage. While it can be reduced again by increasing the size of each VI sequence of bytes, this will also reduce the number of such VI sequences that can be stored in both devices. While transmitting the ID's of both participants will alleviate this problem, it does nothing to prevent an intelligent attack, where it is presumed that the attacker will learn the ID's of the access grantor and an access requestor "accredited" to this access grantor. However, this also means that an attacker must determine one of the limited number of VI's associated with just this one access requestor, and not just one of the whole gamut of VI's associated with any of the access requestors "accredited" to this access grantor.

This one-time pad must be stored in both the access requestor and the access grantor. Both of them have only a finite storage; consequently, with near daily usage, one would expect that a one-time pad would be exhausted at some time. Thus some means must be provided to refill the space with another one-time pad as needed (say, when the previous one-time pad is nearly exhausted). Also, measures to extend the "lifetime" of a one-time pad should be provided so that refilling the space with another one-time pad won't be necessary as often. For example, many actions that an access requestor would request of an access grantor could be considered as not violating security under many circumstances. For instance, closing (and locking) an exterior door generally does not violate security, rather leaving such a door open (and unlocked) generally violates security. Hence, a signal to an access grantor requesting that it close (and lock) an exterior door need not be protected against eavesdropping and thus does not require use of a VI.

The signal that an access requestor sends to an access grantor consists of at most five parts. First is the access requestor identification or transmitter-ID (if it is being sent), second is the access grantor identification or receiver-ID (if it is being sent), third (if needed, and then only in an enhanced version) is a user identification or User-ID, fourth is a "validation-identification" sequence of bytes—to wit, a VI entry from the queue of such byte sequences (if one is needed for the particular requestor), and fifth is the action code (the access requestor's request of the access grantor). The use of VI's in a one-time pad is a critical feature of the present invention.

For both the access requestor and access grantor, the device's model and serial number may conveniently be used as its identifier. Preferably, 16 bytes are assigned for each device identifier, of which 1 byte is to be used for Hamming code and a parity bit, thus providing a Hamming distance of 3 between valid identifiers. Five bytes are assigned to a device's serial number.

The action or function code is preferably a 1 byte value, but only 128 of the possible values are valid, as 1 bit is reserved as a parity bit. If particular applications require more possible values, the action code length may be expanded as needed.

Every access requestor and every access grantor has a unique "validation-identification" queue associated with each access grantor and each access requestor, respectively, to which it is "accredited". An access requestor will remove (and mark as "used" or "invalid") one entry at a time from the appropriate queue (going down the queue in order) for transmission to the associated access grantor. The number of access grantors and access requestors that can be "accredited" to each access requestor and access grantor, respectively, depends on the amount of non-volatile memory in said access requestor and access grantor, and on its allocation. If even further security is desired and the amount of non-volatile memory is sufficient, in an enhanced version of the security system to be described hereinbelow a separate queue may be associated with each access requestor/user-ID/access grantor triplet.

Whenever a VI sequence of bytes is received by an access grantor (and normally an access requestor identification is included in the transmission), the entire VI queue associated with that access requestor will be searched in sequence for a matching entry until a match is found. A VI will be accepted at most once by an access grantor, since it will be marked "used" or "invalid" the first time that an access grantor sees it, so that it cannot be reused. (Even if the associated action could not be performed—e.g., because line power was lacking—since that VI sequence has been compromised by being broadcast, it is marked "used".) Also, any unused antecedents in that VI queue are similarly marked "used" to protect against the case of someone briefly and surreptitiously obtaining another person's access requestor, recording a few VI's from it, returning the access requestor to its owner, and later having access through the access grantor. Thus, as soon as the access requestor's owner uses it to issue a request that has a VI associated with it, any VI's that have been "stolen" from the access requestor will become invalid.

The access grantor should have battery back-up and/or use non-volatile memory for the VI queues, so that it doesn't lose the queue data during a power outage. Preferably it uses non-volatile memory for the VI queues and has at least minimal battery back-up so that any VI received during a power outage can be recognized and marked "used" since its security has already been compromised.

A single bit is preferably employed to mark a VI entry in a queue "used" or "invalid," so that the rest of the space in that entry is available for other purposes. This is permissible since the bit pattern of that VI is no longer of interest. If desired, alternatively the entire VI may be erased. Preferably the entry space made available (excepting the "used bit") will be used to store pertinent data—e.g., the date and time of the use, the User-ID, etc.—to the extent that there is space available, thus providing a useful record of when access was obtained and by whom.

The size of each VI, i.e., the number of bytes in each VI sequence of bytes, is preferably a user-controlled value which can be set to any value from 1 (relatively no security) to 255 (maximum security). It is a constant for each access requestor-access grantor queue, and can be changed only when a new queue (or one-time pad) is installed for an access requestor-access grantor pairing.

For each access requestor-access grantor pairing, one of the two devices will be designated the "access master" and the other will be designated the "access slave." (Actually, another device (e.g., a personal computer) can be the "power behind the throne" for the "access master.") The "access master" has the ability to "accredit" other access devices to itself, to help in "accrediting" itself to other access devices, and to generate a sequence of random bytes. Some devices can only be "access slaves," not having the capability to properly interface to its master in "accrediting" itself to other access devices (or other access devices to itself) or to generate a sequence of random bytes. In the case of radio-transmitter electronic garage door openers, the access grantor would be the access master. In the case of bear researchers' radio transmitters, the access requestor would be the access master. There may be several levels of access mastery divided among several devices, e.g., generation of a sequence of random bytes, accreditation and removal of devices, enable/disable devices, etc.

When an access master sees that it has some spare or unused memory, it will generate a sequence of random numbers (bytes) that will fill this memory. Thus an access master always maintains a cache available for a one-time pad. There are organizations, such as the U.S. government, that would not trust a random number (byte) generator unless it were one that they had developed or researched. Because of the market-presence of these organizations, access masters will preferably have the capability to down-load a one-time pad from some external random number generator. When an access slave is presented to an access master (to which it is accredited) for the down-loading to that access slave of a new or replacement one-time pad, that one-time pad is taken from this cache and is assigned to that access slave.

With continued use, a one-time pad will be exhausted. When it is nearly exhausted, each of the two access devices that recognizes this state of near exhaustion may consider itself to be in the warning area, and will attempt to alert the user (e.g., by light and sound), while the two access devices continue to operate normally otherwise. This warning can be ignored, however, as there is still a reserve area in the access requestor "backing up" the warning area, as explained hereinbelow. When the one-time pad (including the warning area) in an access requestor is exhausted, the access requestor will alert the user (e.g., by a light and sound somewhat different from the warning area alert), and will not transmit until a special sequence of keys is struck on the access requestor's keypad to enable use of VI's found in the reserve area of the transmitter memory. This sequence is preferably published on the access requestor and is needed only to keep the one-time pad from being exhausted accidentally or by a child playing with the access requestor, thereby leaving the possessor of the access requestor "locked out."

At some time before the one-time pad is fully exhausted, the two access devices should be refilled with a common one-time pad. During the refill operation, the "access master" and "access slave" will be in full duplex communication. Note that the transmission of the new sequence (queue) between the two access devices should be somewhat secure; an air wave broadcast is out of the question for this. Preferably the two access devices are placed in direct physical contact for the refill operation. (Actually, any transmission method that does not go beyond a designated "safe" area, even in its side effects, may be used.)

In addition to refill operations, one must be able to remove access requestors from the access grantor's accredited list, and to add new access requestors to the access grantor's accredited list. Similarly, one must be able to remove access grantors from the access requestor's accredited list, and to add new access grantors to the access requestor's accredited list. Usually adding a new access pair is done to both members of the pair simultaneously, while enabling/disabling is usually done at access grantors only. Such operations should be on a higher security level than the refill operations, and may require the intervention of an access master, or the use of a User-ID and a Pass-ID in an enhanced version of the security system, as explained hereinbelow.

It is possible that in some high-security applications one would not want a person to have access even though he may be able to thoroughly examine an "access grantor" (even to extracting the contents of its memory chips and examining them). In this case, the VI received during an access request will be passed through a trap-door encryption algorithm by the access grantor before being compared against its queue. The queue will have been encrypted when it was being installed in the "access grantor," even if it originally came from the "access grantor." Thus, even if someone has access to the data in the "access grantor," he will not be able to impersonate someone else (with an access requestor) who has proper access through that "access grantor" because he will be unable to determine from such data the pre-encryption VI to send to the access grantor.

Referring now to the drawing, and in particular to FIG. 1 thereof, therein illustrated is a system according to the present invention including as an access granter a receiver generally designated A in communication with one or more access-requesters such as either the transmitter generally designated B or the computer generally designated C (the latter typically being a minicomputer or microcomputer). Typically, the receiver A and computer C will be in two-way communication while the receiver A and transmitter B will typically be in only one-way communication, although in more costly systems the receiver A and transmitter B may also be in two-way communication.

Figure 2:
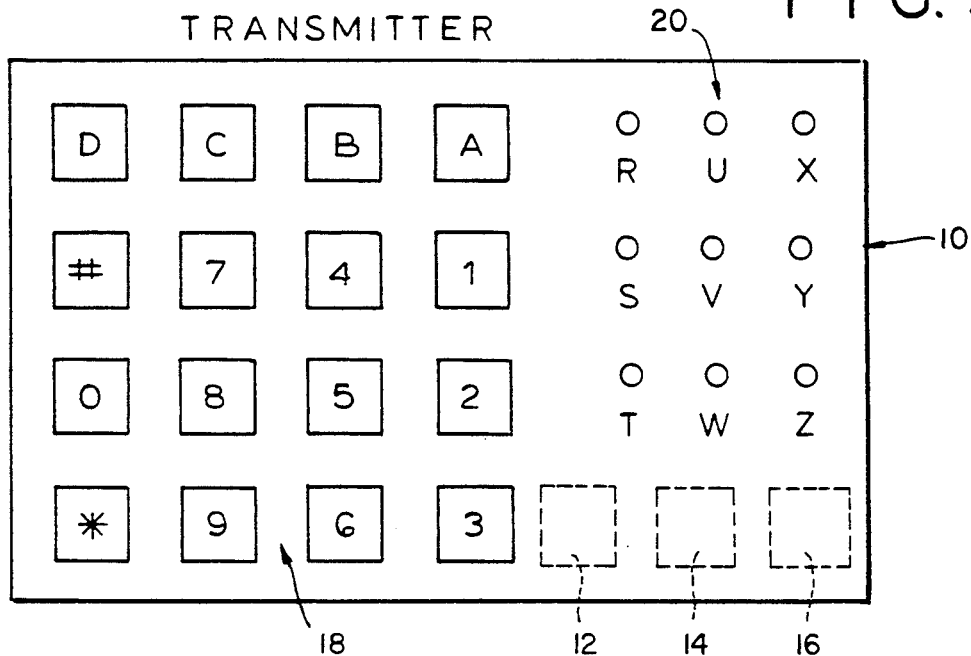
FIG. 2 is a top plan view of the transmitter thereof.

Referring now to FIG. 2, therein illustrated is a transmitter according to the present invention, generally designated by the reference numeral 10. The transmitter 10 comprises structurally a micro-processor or micro-controller (whichever, with attendant (P)ROM and writable RAM memory), a non-volatile memory (with its capacity at least in the kilo-byte range) that may consist of several chips, a keypad, a transmitter chip (or chips) tied to the receiver's receiver chip (or chips), a (multi-cell) battery along with a battery low-charge detector, a (piezo) speaker, an LED array, and a connector (for connecting to a receiver, or some other electronic device, for full duplex communication).

In more functional terms, the transmitter 10 includes memory means 12 for storing a plurality of VI signals in a given sequence, identifier means 14 for identifying in the memory means particular ones of the VI signals as invalid, and transmitting means 16 for transmitting in sequence at least a portion of those VI signals of the memory means not identified as invalid.

The transmitter in addition includes a keypad generally designated 18 of telephone-like keys for the digits 0–9, star and pound signs, as well as four additional keys indicated as A, B, C, D in FIG. 2. The digit keys 0–9 are used for the general purposes of entering a command (i.e., as function or action keys), entering an ID (e.g., User-ID or Pass-ID), authorizing use of a reserve VI, or the like. The keys A, B, C are used to indicate to the transmitter that the user has finished entering a reserve use authorization, a User-ID, or a Pass-ID, respectively. Particular keys of the telephone-like keypad 18 may be used to specify particular functions. For example, keys 1–3 may be used to indicate that a particular one of three doors should be opened (i.e., to allow access), while keys 7–9 may be used to indicate that a particular one of these three doors should be closed (i.e., to disallow access). Different functions can be ascribed to different keys, additional functions may be ascribed to the keys to which no function is presently ascribed, and additional keys may be provided.

In addition to the key pad 18, there is an informational display section 20 consisting of nine light emitting diodes (LED's) or the like labeled with the letters r . . . z in FIG. 2. LED's r and t are red lights used to indicate a weak battery or an empty VI sequence, respectively. LED's s and u are amber lights used to warn that the user has entered the reserve area or a warning area, respectively. LED's x and y are amber lights used to notify the user that he must input the User-ID or Pass-ID, respectively. LED w is a green light used to notify the user that the transmitter is in the process of transmitting. LED's r-w are standard, while LED's x-z are present on the enhanced version (EV) only.

As the user uses up the one-time pad of VI signals stored in the main transmitter memory means, amber LED s or w is lit on the transmitter to warn the user that the time is approaching when a new set cf VI signals must be inputted to the transmitter. An audible warning signal, such as a buzzer, may also be actuated for the same purpose. To accommodate those situations where the user inadvertently neglects to heed this warning and uses up the entire main one-time pad, a reserve system, similar in most respects to the main system but requiring special actuation techniques on the part of the user, is provided.

As previously noted, it is desirable not only to alert the user that exhaustion is imminent by issuing a warning, but also to provide a reserve area "backing-up" the normal area. Thus, for example, a child playing with the access requestor and using up the normal one-time pad area cannot leave the rightful possessor of the access requestor "locked-out". Accordingly, in the preferred embodiment of the present invention, as illustrated, the transmitter additionally includes transmitter reserve memory means for storing a reserve plurality of VI signals in a given sequence. The transmitter reserve memory means is similar to the transmitter memory means for storing a plurality of VI signals in a given sequence in the one-time pad. The reserve memory means will typically comprise simply a segment or subdivision of the transmitter memory means. Such a transmitter will also include reserve means for identifying in the transmitter reserve memory means particular ones of the reserve VI signals as invalid (similar to the means for identifying in the main transmitter memory means particular ones of the VI signals as invalid) and reserve transmitting means for transmitting in sequence at least a portion of those VI signals of the transmitter reserve memory means not identified as invalid (similar to the means for transmitting in sequence at least a portion of those VI signals of the main transmitter memory means not identified as invalid). The reserve identifying means and reserve transmitting means are typically the same as the main identifying means and main transmitting means. However, if desired, for particular applications, the reserve transmitting means, etc., may be separate from the main transmitting means, etc., so as to provide a back-up in case of a failure of the main transmitting means, etc.

A critical difference between the reserve transmitting means and the main transmitting means is that the reserve transmitting means is operable only upon actuation of the reserve actuation means, the reserve actuation means in turn being actuatable only when each of the VI signals in the main transmitter memory means is identified as invalid and requiring manual actuation by a user. This prevents the reserve one-time pad from being accidentally exhausted (for example, by a child playing with the access requestor) and requires the user to strike a special sequence of keys on the keypad in order to utilize the reserve one-time pad. Thus, when the amber LED s is illuminated to indicate that a reserve VI is required, the user will have to use the keys 18 to enter a reserve use authorization in order to actuate the reserve actuation means.

Figure 3:
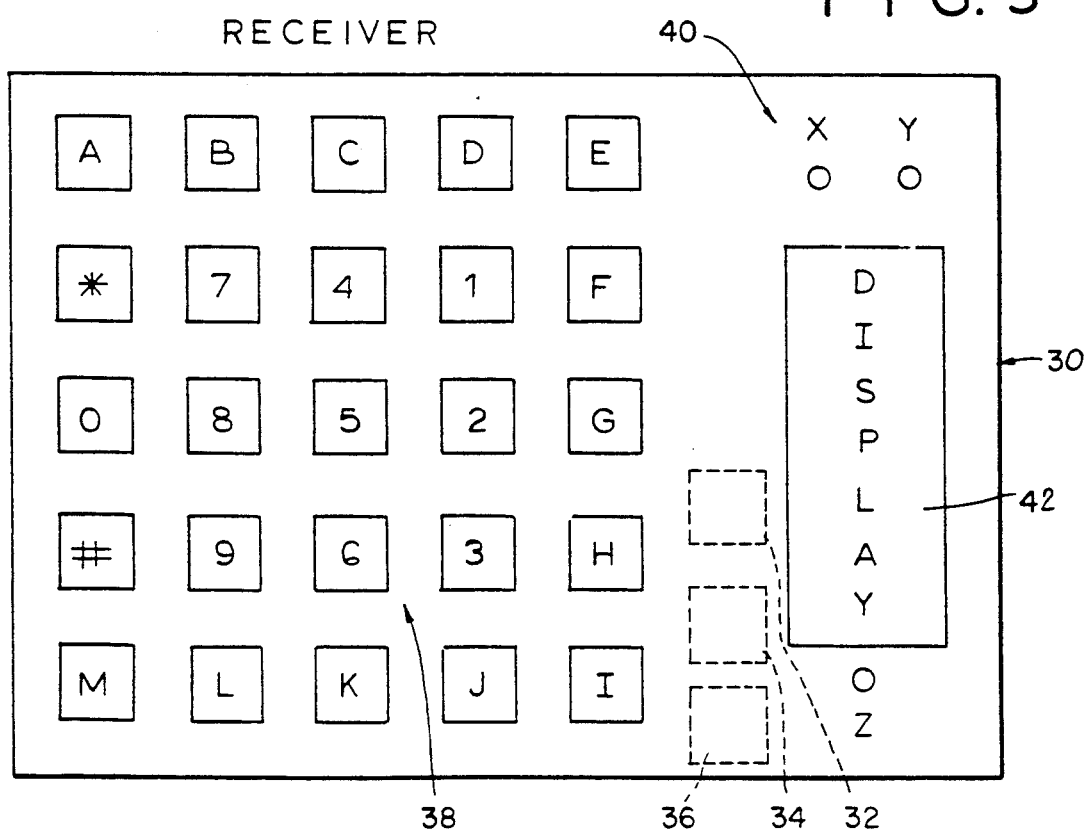
FIG. 3 is a top plan view of the receiver thereof.

Referring now in particular to FIG. 3, therein illustrated is a receiver according to the present invention, generally designated by the reference numeral 30. The receiver 30 consists of a micro-processor or micro-controller (whichever, with attendant (P)ROM and writable RAM memory), a non-volatile memory (with its capacity at least in the kilo-byte range) that may consist of several chips, one or more keypads, a receiver chip (or chips) tied to the transmitter's transmitter chip (or chips), a (multi-cell) battery possibly with a battery low-charge detector, a (piezo) speaker, possibly a BSR-X10 (or the like) interface, an LED array, several connectors (for connecting to a transmitter, or some other electronic devices, such as a computer) for full duplex communication, ports and connectors for controlling other equipment, and access to power from a public utility, generator, or central battery. The receiver is preferably provided with a warning area and system, similar to that of the transmitter, but not a reserve area and system.

In more functional terms, the receiver 30 includes memory means 32 for storing a plurality of VI signals in a given sequence, identifying means 34 for identifying in the memory means particular ones of the VI signals as invalid, and receiving means 36 for receiving signals either from the transmitter 10 or a computer C.

The receiver in addition includes a keypad generally designated 38 of telephone-like keys for the digits 0-9, star and pound signs, as well as thirteen additional keys indicated as A . . . M in FIG. 3. The digit keys 0-9 are used for the general purposes of entering the command (i.e., as function or action keys), entering an ID (e.g., User-ID or Pass-ID), or the like. The keys A . . . M are used for various functions required of the receiver, including the following: to enter the date and time, to indicate the end of the User-ID, to indicate the end of the Pass-ID, to request display of the current date and time, to initiate a review of the transmitters, to add new transmitters or remove old transmitters, to enable or disable Particular transmitters, to refill a transmitter VI sequence, to request information signals by the display, and the like. The star and pound keys may be used to indicate "control mode" and "shift mode," with the control mode and shift mode enabling additional functionality to be ascribed to the other keys. Particular keys of the telephone-like keypad 38 may be used to specify particular functions. For examples, keys 1-3 may be used to indicate that a particular one of three doors should be opened (i.e., to allow access) or keys 7-9 may be used to indicate that a particular one of these three doors should be closed (i.e., to disallow access). The same or different functions can be ascribed to different keys, additional functions may be ascribed to the keys to which no function is presently ascribed, and additional keys may be provided.

In addition to the keypad 38, there is an informational display section 40 consisting of display 42 and three light-emitting diodes (LED's) or the like, labeled with the letters x, y, z in FIG. 3. LED z is a green light used to indicate the presence of line power, LED y is an amber light used to obtain the attention of the user, and LED x is a red light used to indicate an alarm situation to the user. The alarm and attention LED's x, y are controlled by the microprocessor and preferably blink (e.g., at 10 cpm). The display panel 42 is preferably 16 characters wide by 2 lines and is used to impart information and instructions to the user while the user is in communication with the receiver via the keypad 38. For example, while reviewing transmitters, the information being imparted to the viewer may be shown in the display 42. When the alarm or attention LED's x, y are flashing, depression of an appropriate digit key may be used to order the related information to be displayed on the display 42.

Where the user recognizes that a given transmission has not resulted in the desired function—perhaps because of static interfering with a successful transmission—the user can actuate the same operation by key again to manually cause the transmitting means to transmit again using the next successive signal in sequence from the transmitter memory means not identified as invalid. The user can continue to manually actuate the same operation key until finally the transmitter transmits a signal which the receiver has not marked as invalid and therefore responds to it by performing the desired function.

In the enhanced version to be described hereinbelow, where the operation to be performed requires a Pass-ID/User-ID check, the user will have to enter the appropriate user identification (User-ID) and password (Pass-ID) for each actuation of the operation requiring such a check. As this can be quite tedious and time-consuming for the user, in a preferred embodiment of the enhanced version a subsequent actuation of any operation key will not require a Pass-ID/User-ID check if the operation key is depressed within a predetermined short period of time after actuation of an operation key under the aegis of a previously entered Pass-ID/User-ID. In other words, where the time delay is sufficiently short (say, less than five or ten seconds), the transmitter will assume that it is being used by the same user and that the Pass-ID/User-ID check is unnecessary in this instance. Thus in the preferred system, once the user has initially entered the required User-ID and Pass-ID information, he can quickly proceed down the queue of VI signals simply by repeatedly pressing the operation key within a predetermined period of time after the last transmission until he sees the desired function being performed (e.g., the garage door opening).

In a more advanced system where there is two-way broadcast capability for each transmitter/receiver, the receiver or access grantor may provide a signal to the transmitter or access requestor to indicate when a valid VI has been received (according to the access grantor's memory means) and the transmitter or access requestor may automatically at predetermined intervals continue transmitting successive VI signals from the transmitter memory means until it receives an appropriate acknowledgment. The time delay between successive VI signal transmissions of the transmitter would, of course, be designed to enable sufficient time for the receiver to signal the transmitter that an appropriate VI had been received and that, therefore, further VI's did not have to be transmitted. Alternatively, the receiver or access grantor may provide a signal to the transmitter or access requestor to indicate when an invalid or used VI has been received (according to the access grantor's memory means), and the transmitter or access requestor may respond to such an indication by automatically transmitting the next VI signal in the queue from the transmitter memory means (excluding the reserve area) until the last transmission is not responded to with the invalid or used VI indication. Finally, combinations of these systems may be used with the transmitter access requestor providing both valid or unused VI indications and invalid or used VI indications, and the transmitter or access requestor automatically responding appropriately in either case.

Where the security system is designed to provide access to a given receiver by a plurality of transmitters, each of the transmitters includes means for storing a unique transmitter identifier associated with the given transmitter (for example, the model and serial number of the transmitter), and means for transmitting the transmitter identifier as well as a signal that the transmitter memory means has not identified as invalid. In other words, the transmitter will uniquely identify itself to the receiver by means of a transmitter-ID.

Similarly, where the security system is designed to provide a transmitter with access to a plurality of receivers, the transmitter includes a plurality of transmitter memory means, each of the transmitter memory means being keyed to a unique receiver identifier associated with the given receiver. Each such transmitter memory means keyed to a unique receiver identifier may be a separate section of the main transmitter memory means or may simply be composed of entries in the main transmitter memory means which are identified, as by a unique identifier, as being associated with a given receiver. Additionally, in this instance the transmitter includes means for manually selecting a particular receiver identifier and means for transmitting in sequence only those signals not identified as invalid in the transmitter memory means associated with the selected particular receiver identifier. Thus, while keys 1-3 may each be designated as keys for opening doors, there may be three separate doors, each opened by its own receiver, with the selection of the particular receiver to actuate being determined by which of the three keys is actuated. While, as suggested, there may be a plurality of separate receivers in the security system, alternatively a given receiver may have a plurality of different receiver memory means, each of the receiver memory means being keyed to a unique transmitter identifier associated with a given transmitter. In this instance the receiver includes means for receiving the transmitter identifier and VI signal transmitted by a transmitter and means for comparing the VI signal received with only those VI signals of the receiver memory not identified as invalid in the particular receiver memory means associated with the transmitter identifier received.

Thus, it will be appreciated that in a complex system embodiment involving a plurality of receivers and transmitters, an additional level of security is provided for the system because the mere presence of a common VI signal in the one-time pads of the transmitter and receiver is insufficient to provide access; the common VI signal must also be found in a one-time pad of the memory means of the transmitter associated with a given receiver and in a one-time pad of the memory means of the receiver associated with a given transmitter. Accordingly, the common VI signal must be accompanied by an appropriate transmitter identification and receiver identification if a successful access to the system is to be achieved.

As suggested above, an enhanced version (EV) of the security system provides additional security by requiring either or both of a user identification (User-ID) and a password (Pass-ID) to be correctly provided before security-sensitive operations are performed. By use of the keys 18 on the transmitter, the user enters a User-ID which identifies him to the transmitter. The transmitter, according to a table in its memory, then determines whether the action or function requested by the transmitter is one which is authorized for that particular User-ID. For example, a child may be authorized to open or close the garage door, but not to unlock the car door or start the ignition. The User-ID is transmitted to the receiver, with the other pertinent information, where it undergoes a second check for authorization for the operation to be performed. If desired, the check on User-ID at the transmitter may be bypassed entirely in favor of the check in the receiver. While the User-ID provides still an additional level of security, like the transmitter-ID and receiver-ID, the User-ID is transmitted by the transmitter to the receiver and is thus subject to eavesdropping.

Where the application demands the strictest of security, however, the security system may additionally require a Pass-ID to be entered by the user on the keys 18 of the transmitter. The Pass-ID is uniquely associated with the User-ID in the transmitter memory, with different users of the same transmitter having different Pass-ID's. Thus, the system requires both the correct User-ID and the correct Pass-ID to be entered by the aspirant user. On the other hand, the Pass-ID is used only by the transmitter to verify the identity of the present user to perform a desired function and is not transmitted to the receiver. Thus, one cannot by eavesdropping on the signal broadcast by the transmitter to the receiver ascertain the Pass-ID. Accordingly, even if the eavesdropper later obtains an authorized transmitter, he cannot actuate that transmitter to perform a function requiring the entry of a Pass-ID as he is unable to learn the appropriate Pass-ID from the eavesdropping.

In order to prevent the attacker from breaking through the Pass-ID requirement by brute force—that is, by use of a computer-generated sequence of possible Pass-ID's, the transmitter maintains a count of the number of bad Pass-ID's successively entered for each User-ID. Each bad Pass-ID causes the count to be incremented. As long as the count is low (that is, below a pre-determined limit), the system assumes that the user has merely inadvertently entered the wrong Pass-ID and awaits entry of the correct Pass-ID. However, when the count of bad Pass-ID's exceeds for the given User-ID a predetermined limit, the system assumes that there has been an attempted break-in or unauthorized use of the system and proceeds to erase all of the VI entries in the transmitter memory (both main and reserve) and the Pass-ID as well for that User-ID. If desired, the system may erase all of the VI entries and Pass-ID's for all User-ID's rather than just those for the specific User-ID. At this point, the transmitter in effect becomes useless, and other means must be used to pass the security system—for example, the security system must be bypassed by use of a physical key. Each time that a correct User-ID and Pass-ID are entered into the system, the count of bad Pass-ID's for that User-ID is cleared or zeroed so that the full number of bad Pass-ID's for a given User-ID may be entered the next time (within the predetermined limit) before the erase function is performed. The erase function prevents the attacker from attempting to break the Pass-ID by brute force and then, when it fails, dumping or down-loading the system for analysis in order to determine the stored VI's and Pass-ID's. It also allows that User-ID to be transferred to a new user without the previous user's assistance.

The receiver preferably includes means, activated by an unsuccessful comparison of a VI signal received and all the appropriate unused VI signals in the appropriate receiver memory, for generating an unsuccessful comparison indicator. The receiver maintains a count of the unsuccessful comparison indicators issued and, when the count of unsuccessful comparison indicators generated in sequence exceeds a predetermined limit, can identify as used or invalid all of the VI signals not yet identified as used or invalid. In this manner, the receiver interprets a minimum number of unsuccessful access attempts in sequence as an indication that the system is under attack and, in order to prevent a successful attack by brute force through the successive generation of VI's by a computer, disables that User-ID and optionally all User-ID's. Thus, access through the security system is thereafter blocked for that User-ID at least and must be provided either under another User-ID or by other means, such as the use of a physical key or having itself re-enabled by administrative intervention.

Figure 4A:
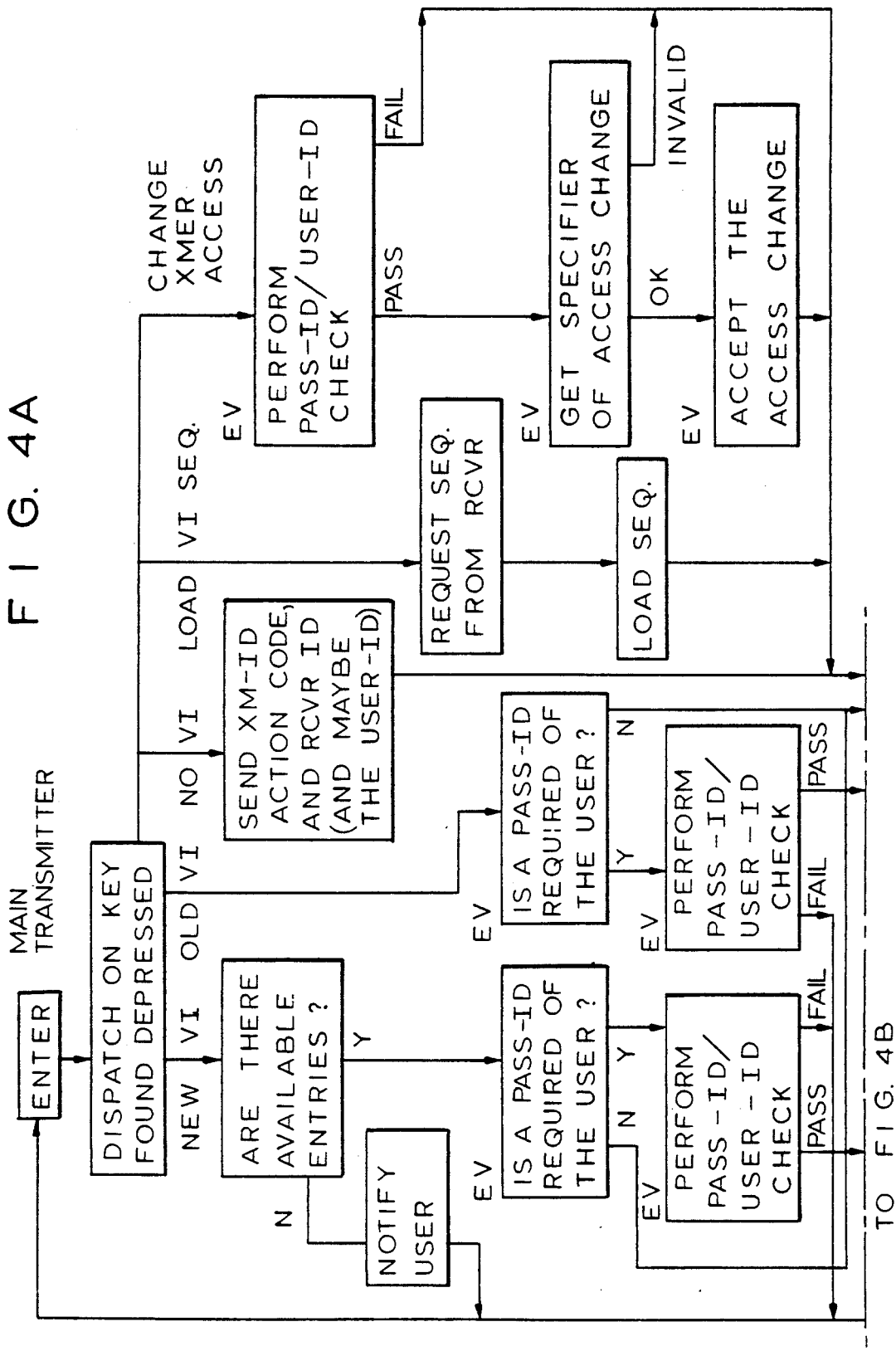

Referring now to FIG. 4, therein illustrated is a flow chart for operation of the transmitter 10. Depending on the operation or action key (one of the digit keys 0–9) of the key set 18 which is actuated, the transmitter recognizes (see FIG. 4A) that a new VI is required, the old VI is to be used, or no VI is required. Additionally, there are two further options: either a new sequence of VI's is to be loaded or the list of those authorized to have access to the transmitter altered in the enhanced version (by alteration of the User-ID and/or Pass-ID or addition/deletion of a User-ID).

Where a new VI is required, first a determination is made as to whether or not there are any available VI entries in the appropriate queue. If not, the user is notified in a predetermined manner, preferably by illuminating both the reserve LED v and warning LED w alternately. If there are available entries, in the enhanced version there is next a determination as to whether or not a Pass-ID is required of the user. If so, the system performs a Pass-ID/User-ID check.

This Pass-ID check (see FIG. 4C) consists of lighting LED x indicating that a User-ID is to be inputted by the user. The user can utilize any of the digit keys 0–9 to enter his User-ID, with the letter key B being struck to indicate the end of the User-ID. The system then illuminates LED y indicating that the Pass-ID is to be inputted by the user. The user can then utilize any of the digit keys 0–9 to enter his Pass-ID, with the letter key C being struck to indicate the end of the Pass-ID. The first key of the User-ID must be entered within a given period of time after illumination of LED x requesting the same, and each succeeding key a given period of time after the previous key. Similarly, the first key of the Pass-ID must be entered within a given period of time after illumination of LED y requesting the same, and each succeeding key a given period of time after the previous key. Otherwise, after expiration of the predetermined given time without an appropriate entry, the check is deemed forfeited (null). Assuming that both the User-ID and Pass-ID have been entered on time, they are both verified, first the User-ID to ensure that there is an authorized user, and then the Pass-ID to ensure that the password is the appropriate one for that user (the entered Pass-ID being checked against the Pass-ID associated with the entered User-ID). If the Pass-ID check fails, the count of bad Pass-ID's for the particular User-ID is incremented. If the count is below a predetermined number, the check is deemed a failure and the system returns to the entry phase, at which point the user can try again using the correct Pass-ID. On the other hand, once the count reaches a predetermined number, all of the VI's in the transmitter memory associated with this User-ID (both in the main memory area and any reserve area) are marked invalid or erased, as is the Pass-ID. The purpose of this is to prevent a subsequent memory dump of the transmitter from revealing any useful information. On the other hand, if the check of the Pass-ID is successful, the count of bad Pass-ID's for the User-ID is cleared or zeroed and the check is indicated as successful.

At this point, the transmitter determines whether or not the next available VI is located in the main memory or reserve memory (see FIG. 4B). If the latter, the user is notified by illumination of LED s indicating that the transmitter is in the reserve area for that User-ID. If, within a given time frame, the user strikes the keys required to provide a "go" order indicating that the VI should be taken from the reserve area, then the transmitter proceeds just as if it were not in the reserve area. On the other hand, if the "go" order is not received within the predetermined time, or if the sequence of keys is not struck in the proper pattern to provide the "go" order, the system returns to the waiting stage.

Assuming that the transmitter is not in the reserve section or that an appropriate "go" order has been received, the transmitter selects the next VI entry in the appropriate transmitter memory for use. In the enhanced version, the transmitter will select the next VI entry in the transmitter memory for the particular User-ID. The transmitter then forwards to the receiver the necessary information, including the action code (determined by the action or operation key), the transmitter-ID (unique to the transmitter used), the receiver-ID (determined by the action or operation key struck), the User-ID (in the enhanced version) and the selected VI entry. If the transmitter is using a current VI from either the reserve area or the warning area, a suitable warning is also issued by means of the appropriate LED s or u. The LED w is illuminated during the period of the transmission to the receiver, and optionally the keyboard is ignored during the transmission period.

To take into account those situations where there has been presumably a transmission from the transmitter to the receiver with a new VI (because the user has performed all of the required steps), but the desired function is not performed by the receiver and it is believed that there may have been some electrical interference with the transmission from the transmitter to the receiver, the system permits the user to retransmit the signal using the same VI, thereby conserving the store of unused VI's. For example, if function keys 1, 2 and 3 indicate that any of three particular doors should be opened, function keys 4, 5 and 6 may indicate, respectively, that the same doors should be opened but that the same VI should be used as in the last transmission. As illustrated in the flow chart (see FIG. 4A), when the function is the transmission with an old VI, in the enhanced version of the system another Pass-ID/User-ID check is performed and, if successful, the system proceeds immediately to the next transmission without either the special reserve section processing or being advanced to the next VI entry. In order to save the user the time and effort involved in going through the Pass-ID/User-ID check because of the nature of the function, the check may be dispensed with if the function key specifying the old VI is actuated within a predetermined time (for example, 15 seconds) of the last transmission using the same key (e.g., one of keys 4, 5, 6) or the key for the same function but requiring the check (e.g., one of keys 1, 2, 3). This abbreviated procedure is based on the generally reasonable assumption that an attacker would not have access to the transmitter within 15 seconds (or whatever is the predetermined time limit) after the last broadcast by the authorized user. For example, in the case of a garage door opening, the user would still be standing in front of the garage door waiting for the garage door to complete opening or, even if the garage door had opened and then been manually closed within the 15 seconds, he would still be around to note that the garage was being re-opened without his having entered the appropriate instruction on the transmitter.

As earlier indicated, there may be certain functions which do not require any security, such as closing a garage door. When one of these non-sensitive functions are actuated (e.g., by actuating one of the function keys 7, 8, 9 for the three doors respectively), the transmitter immediately sends the appropriate action code, along with the transmitter-ID and receiver-ID (see FIG. 4A). If desired, perhaps for documentary purposes, the system may require a User-ID to be entered so that the User-ID is also transmitted and an appropriate record formed in the receiver.

When the load VI sequence is requested (see FIG. 4A), perhaps by pressing a particular number at a time when the transmitter is in duplex communication with the receiver, the transmitter sends an appropriate request to the receiver and loads the sequence of VI's received. As this is an act requiring the highest level of security, it can be performed only when there is full duplex communication (that is, physical contact between the transmitter and receiver). Accordingly, it is unnecessary to perform the Pass-ID/User-ID check for this function. To change the transmitter access designations in the enhanced version of the system (see FIG. 4A), the Pass-ID/User-ID check is performed first and then, if successful, the appropriate access changes are entered on and accepted by the transmitter according to a predetermined convention.

Figure 5:
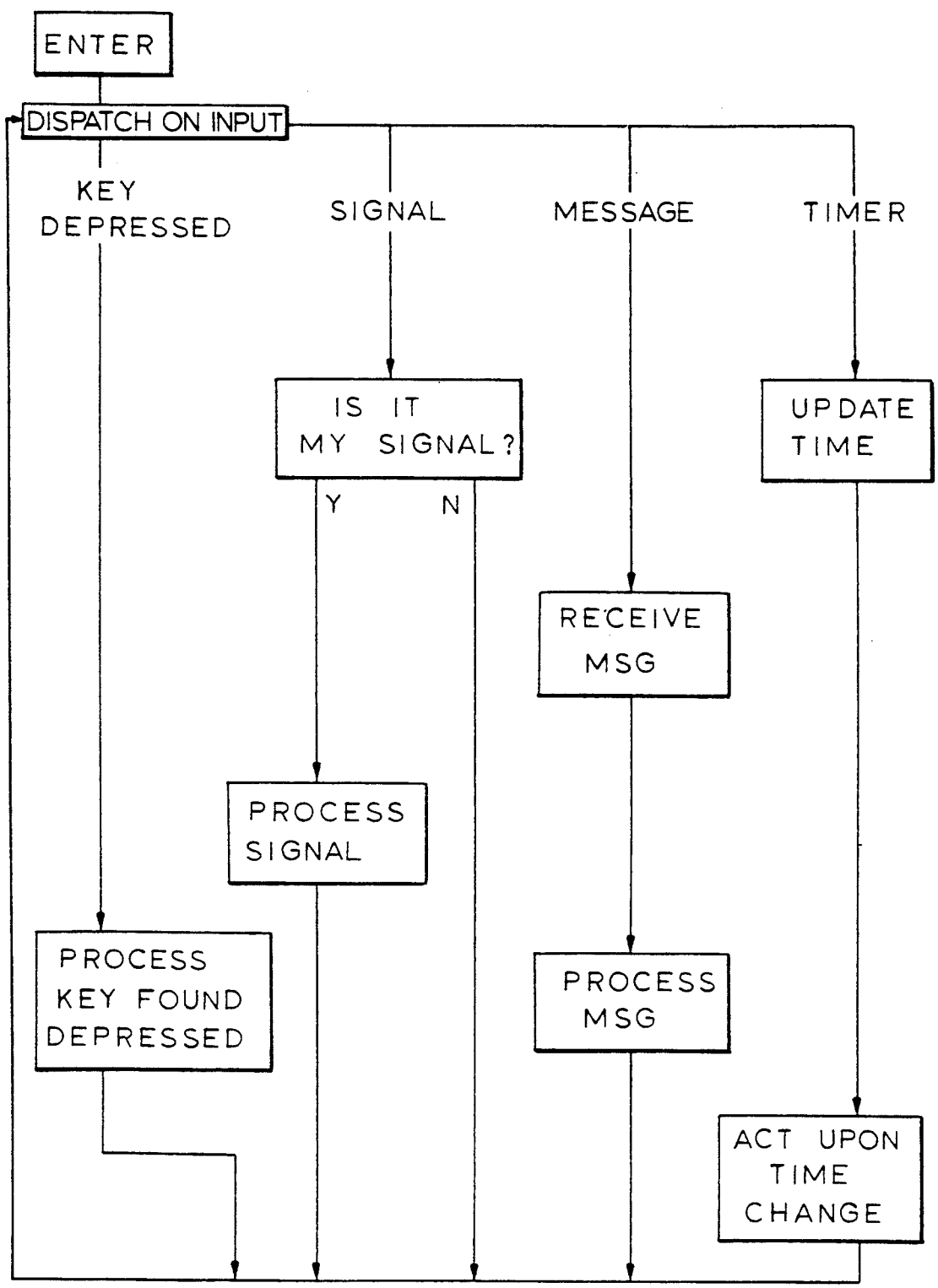
FIG. 5 is an overall schematic of a flow chart of the operation of the receiver.

Referring now to FIG. 5, the receiver in the "dispatch on input" mode can be actuated by a variety of different means. If actuated by an operation key on the receiver A, the operation key actuated (e.g., depressed) is processed. If actuated by a signal received from a transmitter B, the receiver A first determines whether or not the received signal is intended for that receiver as opposed to other receivers (by examination of the receiver-ID) and, if so, processes the signal. If actuated by a signal from a computer C, such as a personal computer, the receiver A receives the message and then processes it. Finally, if actuated by a timer interrupt, the receiver A responds simply by updating the time appropriately and taking any action required by the change in time.

Referring now to FIG. 6, and in particular to FIG. 6A, in order to process a signal received from the transmitter B, the receiver A leaves the waiting mode and first determines whether or not the specified action knows its receiver (i.e., uniquely designates a particular receiver). If it is not unique to a particular receiver, but the signal comes from a secure source and the requested function is of a certain type, the requested function is performed. If it is an action that specifies its receiver, the receiver first determines from the receiver-ID in the transmission whether or not it is the designated receiver. If so, it then determines whether or not it recognizes the transmitter from the transmitted transmitter-ID. If so, in the enhanced version, the receiver checks to determine whether the User-ID, if present, is appropriate. If so, the receiver determines whether the requested function requires a VI. If not, the system immediately performs the requested function; but if the action does require a VI, it then determines whether or not the transmitted VI is a valid VI (see FIG. 6B). Note that in the enhanced version, the VI must be valid for that particular User-ID. If the VI is valid, then the VI queue is updated (that is, the current VI is marked as "used" or "invalid"). Assuming that appropriate time constraints for the particular user, transmitter, receiver and action have been met, the requested function is then performed. Prior to returning to the waiting mode, the receiver determines whether or not the VI was taken from the warning area or reserve area, and, if so, issues a warning before returning to the waiting mode. It should be appreciated that the receiver only provisionally performs a desired action (that is, it only passes on the security aspects of the operation), with the actual performance of the action being dependent upon such matters as line power, and the like, as required for the requested function to be performed.

Referring now to FIG. 7, and in particular to FIG. 7A, in order to process a message received from the computer C, the receiver A leaves the waiting mode and first determines whether or not it is in a valid logon. If it is not, it then requests and awaits a Pass-ID if one is present. If none is present or the Pass-ID is valid, the receiver notes that it is in a valid logon.

Assuming a valid logon, the receiver dispatches appropriately, depending on the type of message received from the computer. Referring now to FIG. 7B as well, because of the duplex communication between the computer and the receiver, the receiver can allow the computer to review the transmitters, to specify new transmitters (with the computer forwarding the new transmitter-ID), specify a transmitter by an alias (with the computer specifying the alias), dump the transmitter-ID's, review receiver states, and the like. Variables for the system may be revalued, with the computer specifying the name of the variable, and the receiver dumping the old value of the variable, receiving the new value of the variable from the computer, and updating the variable value in its memory. Further, the receiver can dump the usage data of the receiver relating to used VI signals, first forwarding them to the computer and then, upon confirmation that the dump has been received by the computer, assigning the freed-up VI segments to available memory.

Figure 8B:
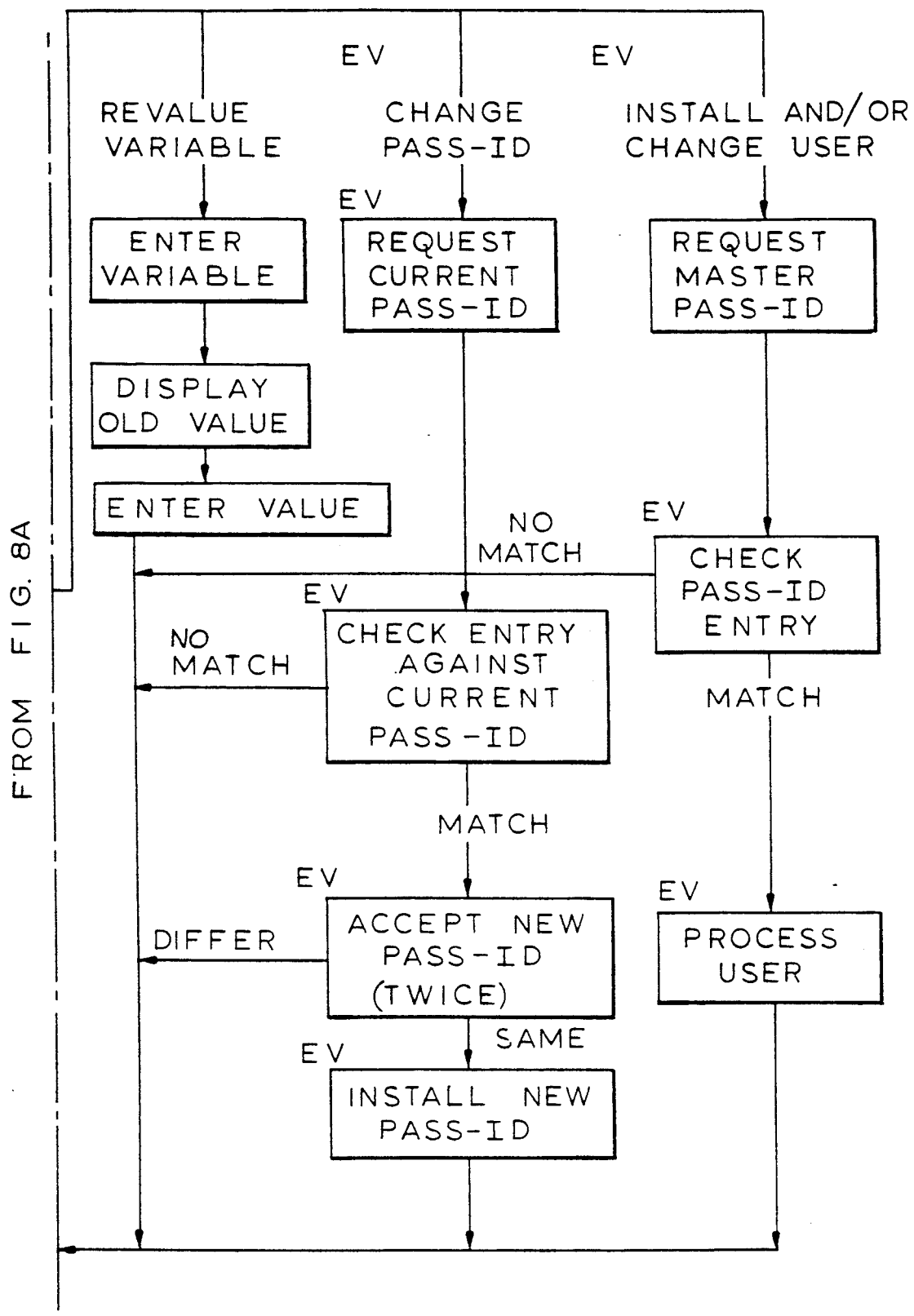

Referring now to FIG. 8, and in particular to FIG. 8A, in addition to being able to receive signals from the transmitter B and messages from the computer C, the receiver A can also respond to actuation (i.e., depression) of its own keys. In response to depression of a key on the receiver, if required, the receiver requests and awaits entry of a Pass-ID if one is present. If none is present or the Pass-ID entered is valid, it waits for the next key depression (subject to the expiration of a predetermined time interval indicating a time-out). Depending upon the key then depressed, the receiver reviews the transmitters, specifies new transmitters, specifies aliases for transmitters, revalues variables (see FIG. 8B), and the like in a manner similar to its processing of a message from the computer. In addition, however, in the enhanced version the receiver can accept messages instructing it to change a Pass-ID or to install and/or change a User-ID. Upon receipt of an instruction to change a Pass-ID, the receiver first requires that the current Pass-ID be entered. If the entered Pass-ID does not match the current Pass-ID, no further action is taken. Assuming that the entered Pass-ID matches the current Pass-ID in the receiver, the receiver then requires that the new Pass-ID be entered twice by the user as a safety measure. If both entries are the same, the new Pass-ID is installed. If the two new Pass-ID entries are not the same, the system takes no further action with regard to changing the Pass-ID. In order to install and/or change a user, a master Pass-ID must be entered by the user and successfully matched against a master Pass-ID in memory, before the user is installed or changed. It will be appreciated that, because of the special security considerations which must be given to the critical functions of changing a Pass-ID or installing and/or changing a user, these functions can be performed only by one with direct physical access to the receiver.

To summarize, the present invention provides a security system which cannot be defeated by eavesdropping and contains numerous safety features to detect, defeat, and/or record attempted breaches of its security.

Now that the preferred embodiments of the present invention have been shown and described in detail, various modifications and improvements thereon will become readily apparent to those skilled in the art. Accordingly, the appended claims are to be construed broadly, in a manner consistent with the spirit and scope of the invention disclosed herein, and not limited by the foregoing disclosure.

I claim:

1. A security system comprising:
   (A) a transmitter including in operative communication:
      (i) a transmitter memory means for storing a plurality of signals in a given sequence,
      (ii) means for identifying particular ones of said signals in said transmitter memory means as invalid, and
      (iii) means for transmitting to a receiver in sequence at least a portion of those signals of said transmitter memory means not identified as invalid; and
   (B) a receiver including in operative communication:
      (i) means for receiving signals transmitted by said transmitter,
      (ii) receiver memory means for storing a plurality of signals in a given sequence,
      (iii) means for identifying particular ones of said plurality of signals in said receiver memory means as invalid, and
      (iv) means for comparing the signal received by said means for receiving with those signals of said receiver memory means not identified as invalid, and, upon a successful comparison, both identifying the signal in said receiver memory means as invalid thereafter and generating a successful comparison indicator.

2. The security system of claim 1 wherein said signals are numbers.

3. The security system of claim 2 wherein said numbers are random numbers generated by an external device separable from said transmitter, said external device including means for generating a plurality of random numbers in a given sequence and forwarding at least a portion of said plurality of random numbers in a given sequence to said transmitter.

4. The security system of claim 1 wherein said means for identifying in said transmitter memory means particular ones of said signals as invalid, and said means in said receiver for identifying in said receiver memory means particular ones of said signals as invalid, erase said particular ones of said signals.

5. The security system of claim 1 wherein said transmitter includes manual means for causing said transmitting means to transmit the next successive signal in sequence of said transmitter memory means not identified as invalid.

6. The security system of claim 1 wherein said receiver includes means, upon an unsuccessful comparison, for generating an unsuccessful comparison indicator.

7. The security system of claim 6 wherein said receiver includes means, active only upon generation in sequence of a predetermined number of unsuccessful comparison indicators, for indicating that the system is under attack.

8. The security system of claim 1 including a plurality of said transmitters.

9. The security system of claim 8 wherein each of said transmitters includes means for storing a unique transmitter identifier associated with a given transmitter, and means for transmitting the transmitter identifier prior to transmitting in sequence those signals of said transmitter memory means not identified as invalid.

10. The security system of claim 9 wherein said receiver includes means for receiving the transmitter identifier transmitted by a transmitter and a plurality of said receiver memory means, each of said receiver memory means being keyed to a unique transmitter identifier associated with a given transmitter, and said comparison means comparing the signal received with only those signals of said receiver memory means not identified as invalid in the receiver memory means associated with the transmitter identifier received.

11. The security system of claim 1 including a plurality of said receivers.

12. The security system of claim 11 wherein said transmitter includes a plurality of said transmitter memory means, each of said transmitter memory means being keyed to a unique receiver identifier associated with a given receiver, manual means for selecting a particular receiver identifier, and means for transmitting in sequence only those signals not identified as invalid in the transmitter memory means associated with the selected particular receiver identifier.

13. The security system of claim 1 wherein said transmitter additionally includes transmitter user identification memory means for storing at least one user identification, means for receiving a user identification from the user, and means for comparing the received user identification with the user identifications stored in said transmitter user identification memory means, said transmitting means being operable only after a successful comparison.

14. The security system of claim 13 wherein said transmitter user identification memory means stores a plurality of user identifications in a given sequence and said comparing means compares the received user identification with each of the user identifications stored in the transmitter user identification memory means in sequence until a successful comparison or exhaustion of the plurality of user identifications.

15. The security system of claim 13 wherein said transmitter additionally includes password memory means for storing at least one password, means for receiving a password from the user, and means for comparing the received password with the passwords stored in the transmitter password memory means, said transmitting means being operable only after a successful comparison.

16. The security system of claim 15 additionally including means for counting the number of passwords received since the last successful comparison for a given user identification, and means for operatively erasing each of the passwords and signals in said transmitter password memory means and transmitter memory means for the given user identification if more than a predetermined number of passwords are received since the last successful comparison.

17. The security system of claim 15 wherein said transmitter includes said transmitter password memory means for storing at least one password as associated with each user identification, and said means for comparing the received password with the password identification stored in said transmitter password memory means compares the received password only with the passwords stored in said transmitter password memory means as associated with a given user identification.

18. The security system of claim 1 wherein said transmitter additionally includes reserve actuation means requiring manual actuation by a user, transmitter reserve memory means for storing a reserve plurality of signals in a given sequence, reserve means for identifying in said transmitter reserve memory means particular ones of said signals as invalid, and reserve transmitting means for transmitting in sequence at least a portion of those signals of said transmitter reserve memory means not identified as invalid, said reserve transmitting means being operable upon actuation of said reserve actuation means.

19. The security system of claim 18 wherein said reserve actuation means is actuatable only when each of said signals in said transmitter memory means is identified as invalid.

20. A security system comprising:
(A) a transmitter including in operative communication:
(i) transmitter memory means for storing a plurality of numeric signals in a given sequence,
(ii) means for identifying particular ones of said signals in said transmitter memory means as invalid,
(iii) means for transmitting to a receiver in sequence at least a portion of those signals of said transmitter memory means not identified as invalid, and
(iv) a reserve system having reserve actuation means, actuatable only when each of said signals in said transmitter memory means is identified as invalid and requiring manual actuation by a user, transmitter reserve memory means for storing a reserve plurality of signals in a given sequence, reserve means for identifying particular ones of said signals as invalid in said transmitter reserve memory means, and reserve transmitting means, operable upon actuation of said reserve actuation means, for transmitting in sequence at least a portion of those signals of said transmitter reserve memory means not identified as invalid; and (B) a receiver including in operative communication:
  (i) means for receiving numeric signals transmitted by said transmitter,
  (ii) receiver memory means for storing a plurality of numeric signals in a given sequence,
  (iii) means for identifying particular ones of said signals as invalid in said receiver memory means,
  (iv) means for comparing the signal received by said means for receiving with those signals of said receiver memory means not identified as invalid, and, upon a successful comparison, both identifying the signal and all other compared signals in said receiver memory means as invalid thereafter and generating a successful comparison indicator, and, upon an unsuccessful comparison, for generating an unsuccessful comparison indicator, and
  (v) means, active only upon generation in sequence of a predetermined number of unsuccessful comparison indicators, for indicating that the system is under attack; and (C) an external device, separable from said transmitter, for generating a plurality of random numbers in a given sequence and forwarding at least a portion of said plurality of random numbers in a given sequence to said transmitter as the numeric signals.

21. The security system of claim 20 including a plurality of said transmitters, each of said transmitters further including means for storing a unique transmitter identifier associated with itself, and means for transmitting the transmitter identifier prior to transmitting in sequence those signals of said transmitter memory means not identified as invalid; said receiver further including means for receiving the transmitter identifier transmitted by a transmitter and a plurality of said receiver memory means, each of said receiver memory means being keyed to a unique transmitter identifier associated with a given transmitter, and said comparison means comparing the signal received with only those signals of said receiver memory means not identified as invalid in the receiver memory means associated with the transmitter identifier received.

22. The security system of claim 20 including a plurality of said receivers, said transmitter further including a plurality of said transmitter memory means, each of said transmitter memory means being keyed to a unique receiver identifier associated with a given receiver, manual means for selecting a particular receiver identifier, and means for transmitting in sequence only those signals not identified as invalid in the transmitter memory means associated with the selected particular receiver identifier.

23. The security system of claim 20 wherein said transmitter additionally includes:
  (i) transmitter user identification memory means for storing a plurality of user identifications in a given sequence,
  (ii) means for receiving a user identification from the user,
  (iii) means for comparing the received user identification with each of the user identifications stored in said transmitter user identification memory means in sequence until a successful comparison, said transmitting means being operable only after a successful comparison.

24. The security system of claim 23 wherein said transmitter additionally includes:
  (i) transmitter password memory means for storing a password for each user identification,
  (ii) means for receiving a password from the user,
  (iii) means for comparing the received password with the password stored in said transmitter password identification memory means for the received user identification, said transmitting means being operable only after a successful comparison,
  (iv) means for counting the number of passwords received since the last successful comparison for the received user identification, and
  (v) means for operatively erasing the password in said transmitter password memory means for the received user identification and each of the signals in said transmitter memory means for the received user identification if more than a predetermined number of passwords are received from the user since the last successful password comparison for the received user identification.

* * * * *